(12) United States Patent
Park et al.

(10) Patent No.: US 11,543,854 B2
(45) Date of Patent: Jan. 3, 2023

(54) FOLDABLE DISPLAY DEVICE

(71) Applicant: SAMSUNG DISPLAY CO., LTD., Yongin-si (KR)

(72) Inventors: In Soo Park, Yongin-si (KR); Se Yong Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 41 days.

(21) Appl. No.: 16/817,996

(22) Filed: Mar. 13, 2020

(65) Prior Publication Data
US 2021/0026407 A1 Jan. 28, 2021

(30) Foreign Application Priority Data
Jul. 22, 2019 (KR) .......................... 10-2019-0088463

(51) Int. Cl.
*G06F 1/16* (2006.01)

(52) U.S. Cl.
CPC .......... *G06F 1/1618* (2013.01); *G06F 1/1681* (2013.01)

(58) Field of Classification Search
CPC .... G06F 1/1618; G06F 1/1681; G06F 1/1616; H04M 1/0268; H04M 1/022; G09F 9/301
See application file for complete search history.

(56) References Cited

U.S. PATENT DOCUMENTS

| | | | |
|---|---|---|---|
| 9,235,239 B2 * | 1/2016 | van Dijk | G06F 1/1681 |
| 9,535,452 B2 | 1/2017 | Ahn | |
| 9,557,771 B2 * | 1/2017 | Park | G06F 1/1681 |
| 9,632,530 B2 | 4/2017 | Jacobs | |
| 10,028,395 B2 * | 7/2018 | Chen | G06F 1/1626 |
| 10,036,188 B1 * | 7/2018 | Yao | H05K 5/0226 |
| 10,152,089 B2 | 12/2018 | Park et al. | |
| 10,429,896 B2 * | 10/2019 | Kuramochi | G06F 1/1681 |
| 10,480,227 B1 * | 11/2019 | Chen | E05D 3/122 |
| 10,550,880 B2 * | 2/2020 | Hsu | G06F 1/1652 |
| 10,775,852 B2 * | 9/2020 | Kim | G06F 1/1641 |
| 10,824,197 B1 * | 11/2020 | Hsu | G06F 1/1652 |
| 10,845,850 B1 * | 11/2020 | Kang | H04M 1/022 |
| 10,955,880 B2 * | 3/2021 | Wang | G06F 1/1616 |

(Continued)

FOREIGN PATENT DOCUMENTS

| | | |
|---|---|---|
| KR | 10-2015-0096946 A | 8/2015 |
| KR | 10-2016-0118407 A | 10/2016 |
| KR | 10-1776262 B1 | 9/2017 |

*Primary Examiner* — Anthony M Haughton
*Assistant Examiner* — Theron S Milliser
(74) *Attorney, Agent, or Firm* — Lewis Roca Rothgerber Christie LLP

(57) ABSTRACT

A foldable display device includes: a display panel including a foldable display area; a first base plate overlapping a portion of the foldable display area to guide folding of the display panel; a second base plate overlapping another portion of the foldable display area to guide the folding of the display panel together with the first base plate; a first rotor coupled to the first base plate to rotate around a first virtual rotation axis, a second rotor coupled to the second base plate to rotate around a second virtual rotation axis; a follower in contact with the first and second rotors to reciprocate in a first direction by rotation of at least one of the first and second rotors; and a bracket coupled to the first and second rotors to guide a rotation path of each of the first and second rotors.

19 Claims, 13 Drawing Sheets

(56) References Cited

U.S. PATENT DOCUMENTS

| | | | |
|---|---|---|---|
| 10,963,020 B2* | 3/2021 | Kim | G06F 1/1641 |
| 10,983,569 B2* | 4/2021 | Lin | G06F 1/1616 |
| 11,016,541 B2* | 5/2021 | Lin | E05D 11/0054 |
| 2012/0236484 A1* | 9/2012 | Miyake | G06F 1/1616 |
| | | | 361/679.01 |
| 2013/0021762 A1* | 1/2013 | van Dijk | H04M 1/022 |
| | | | 361/749 |
| 2015/0366089 A1* | 12/2015 | Park | G06F 1/1641 |
| | | | 361/679.01 |
| 2016/0143162 A1* | 5/2016 | Van Dijk | H05K 5/0226 |
| | | | 361/679.01 |
| 2017/0328102 A1* | 11/2017 | Kato | G06F 1/1681 |
| 2018/0146560 A1* | 5/2018 | Chen | H05K 5/0017 |
| 2019/0086965 A1* | 3/2019 | Kuramochi | G06F 1/1616 |
| 2019/0166703 A1* | 5/2019 | Kim | H05K 5/0226 |
| 2019/0369668 A1* | 12/2019 | Kim | H01L 51/5237 |
| 2019/0390703 A1* | 12/2019 | Hsu | E05D 11/082 |
| 2020/0174531 A1* | 6/2020 | Lin | F16C 11/04 |
| 2020/0183464 A1* | 6/2020 | Lin | G06F 1/1681 |
| 2020/0218315 A1* | 7/2020 | Huang | G06F 1/1637 |
| 2020/0264673 A1* | 8/2020 | Kim | G06F 1/1652 |
| 2020/0264674 A1* | 8/2020 | Km | G06F 1/1641 |
| 2020/0348732 A1* | 11/2020 | Kang | G06F 1/1681 |
| 2020/0371564 A1* | 11/2020 | Kim | G06F 1/1652 |
| 2020/0409427 A1* | 12/2020 | Hsu | G06F 1/1681 |
| 2021/0041921 A1* | 2/2021 | Kang | G06F 1/1652 |

\* cited by examiner

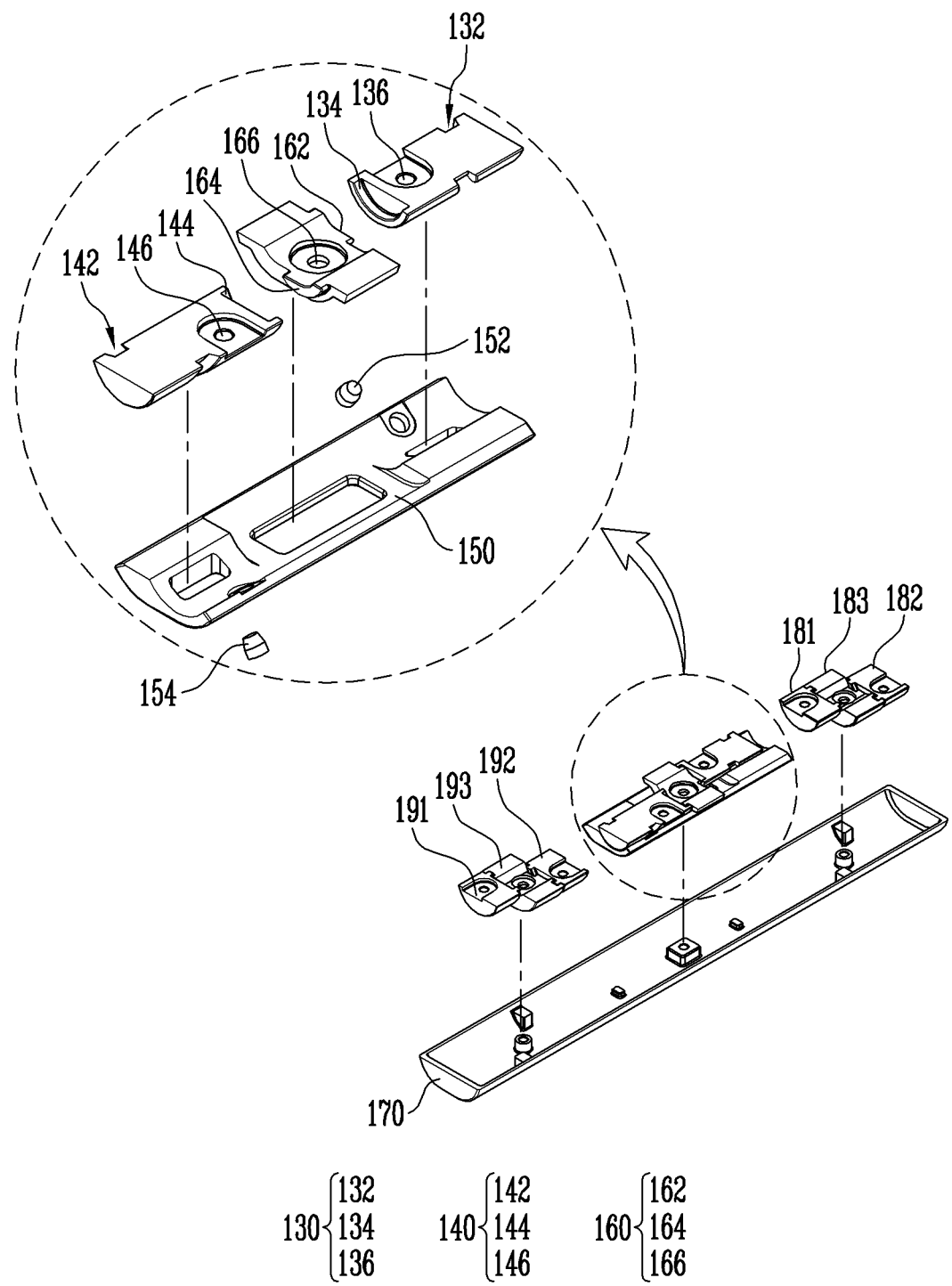

FOLDABLE DISPLAY DEVICE

CROSS-REFERENCE TO RELATED APPLICATION

This application claims priority to and the benefit of Korean Patent Application No. 10-2019-0088463, filed on Jul. 22, 2019 in the Korean Intellectual Property Office, the entire content of which is herein incorporated by reference.

BACKGROUND

1. Field

Aspects of embodiments of the present disclosure relate to a display device.

2. Description of the Related Art

Recently, research and development of a foldable display device, a bendable display device, a rollable display device, and the like, using advantages of a flexible display panel that may be bent or folded are in progress. Such display devices may be applied to various fields, such as a television and a monitor, as well as a portable electronic apparatus and a wearable apparatus.

The foldable display device may be implemented in an in-folding structure in which display surfaces are folded to face each other, or in an out-folding structure in which the display surfaces are folded outwardly.

The foldable display device includes a hinge device for assisting folding and supporting a folded shape and/or an unfolded shape of the foldable display device. Research and development of the hinge device for reducing a manufacturing cost while precisely assisting the folding/unfolding of the foldable display device are in progress.

SUMMARY

According to an aspect of embodiments of the present disclosure, a foldable display device having a hinge device included therein is provided. According to another aspect of embodiments of the present disclosure, a foldable display device that controls symmetrical folding of a display panel by using interaction of a rotation motion of a rotor and linear motion (or straight line motion) of a follower is provided.

However, aspects and objects of the present disclosure are not limited to those described above, and may be variously expanded without departing from the spirit and scope of the disclosure.

According to one or more embodiments, a foldable display device includes: a display panel including a first display area, a second display area, and a foldable display area between the first display area and the second display area; a first base plate overlapping a portion of the foldable display area to guide folding and unfolding of the display panel; a second base plate overlapping another portion of the foldable display area to guide the folding and the unfolding of the display panel together with the first base plate; a first rotor coupled to the first base plate to rotate around a first virtual rotation axis; a second rotor coupled to the second base plate to rotate around a second virtual rotation axis in a direction opposite to a rotation direction of the first rotor; a follower in contact with the first and second rotors to reciprocate in a first direction by rotation of at least one of the first and second rotors; and a bracket coupled to the first and second rotors to guide a rotation path of each of the first and second rotors.

According to an embodiment, the foldable display device may further include a hinge cover coupled to the bracket to limit movement of the follower in a direction other than the first direction.

According to an embodiment, the follower may be arranged between the bracket and the hinge cover.

According to an embodiment, the first rotor may include a curved surface having a diameter corresponding to the first rotation axis and a first groove of a spiral shape on the curved surface.

According to an embodiment, the second rotor may include a curved surface having a diameter corresponding to the second rotation axis and a second groove of a spiral shape on the curved surface.

According to an embodiment, the follower may include a first pin arranged to be inserted into the first groove of the first rotor and moved within the first groove, and a second pin arranged to be inserted into the second groove of the second rotor and moved within the second groove. The first and second pins may convert rotation of the first and second rotors into straight line motion of the follower, and the first direction may be parallel to the first and second rotation axes.

According to an embodiment, the first rotor and the second rotor may concurrently rotate at a same angle in directions opposite to each other.

According to an embodiment, spiral directions of the first groove and the second groove may be opposite to each other.

According to an embodiment, the bracket may include a first side portion arranged to engage with a side surface of the first rotor to guide the rotation path of the first rotor, and a second side portion corresponding to an opposite side of the first side portion, and arranged to engage with a side surface of the second rotor to guide the rotation path of the second rotor.

According to an embodiment, a first side surface of the first rotor may be in surface contact with a first side surface of the follower, and a first side surface of the second rotor may be in surface contact with a second side surface of the follower opposite to the first side surface of the follower.

According to an embodiment, when the first rotor rotates in a clockwise direction, the follower may be moved in the first direction parallel to the first and second rotation axes, and when the second rotor rotates in a counterclockwise direction, the follower may be moved in a direction opposite to the first direction.

According to an embodiment, on a plane, the first side surface of the follower and the second side surface of the follower may be symmetric with each other with respect to a symmetry axis corresponding to a second direction, and the second direction may be a direction perpendicular to the first direction and parallel to an unfolded state of the display panel.

According to an embodiment, the bracket may include a first bracket arranged to engage with a second side surface of the first rotor to guide the rotation path of the first rotor, and a second bracket arranged to engage with a second side surface of the second rotor to guide the rotation path of the second rotor. The foldable display device may include a first hinge group including the first rotor, the second rotor, the first bracket, the second bracket, and the follower.

According to an embodiment, the foldable display device may further include a second hinge group having a same structure as the first hinge group and arranged to be spaced apart from the first hinge group in the first direction. The second hinge group may be configured in a form of the first hinge group being rotated by 180° on a plane.

According to an embodiment, when the display panel is folded or unfolded, the follower included in the first hinge group and a follower included in the second hinge group may be concurrently moved in directions opposite to each other.

According to an embodiment, the follower may include a first guide hole in a first side surface that is in contact with the first rotor, and a second guide hole in a second side surface that is in contact with the second rotor. Widths in a horizontal direction of each of the first and second guide holes may be greater than widths in a vertical direction of each of the first and second guide holes.

According to an embodiment, the first rotor may include a first protrusion portion arranged on a first side surface of the first rotor to be inserted into the first guide hole, and the second rotor may include a second protrusion portion arranged on a second side surface of the second rotor to be inserted into the second guide hole.

According to an embodiment, a portion where the first protrusion portion that is in contact with an inside of the first guide hole may be changed by the rotation of the first rotor, and a portion where the second protrusion portion that is in contact with an inside of the second guide hole may be changed by the rotation of the second rotor.

According to an embodiment, the bracket may include a first bracket arranged to engage with a second side surface, which is an opposite side of the first side surface of the first rotor, to guide the rotation path of the first rotor; and a second bracket arranged to engage with a second side surface, which is opposite side of the first side surface of the second rotor, to guide the rotation path of the second rotor.

According to an embodiment, the first direction may correspond to the vertical direction.

The foldable display device including the hinge device according to embodiments of the present disclosure may implement folding and unfolding by using a simple connection structure of a plurality of rotors and a follower and a two-axes hinge structure based on rotation motion of the rotors and a straight line motion (vertical movement or horizontal movement) of the follower. Therefore, folding/unfolding angles of the first base plate (and a first panel support member) and the second base plate (and a second panel support member) coincide, and symmetrical folding/unfolding of the foldable display device may be implemented. In addition, a manufacturing cost may be reduced by eliminating a configuration including a complicated driving mechanism and a plurality of sophisticated gears, springs, and/or the like, and implementing a two-axes hinge mechanism with a simple structure.

However, aspects and effects of the present disclosure are not limited to the above-described aspects and effects, and may be variously expanded without departing from the spirit and scope of the present disclosure.

BRIEF DESCRIPTION OF THE DRAWINGS

The above and other features of the present disclosure will become more apparent by describing in further detail some example embodiments thereof with reference to the accompanying drawings, in which:

FIG. 2B is an exploded perspective view illustrating an example of a portion of the hinge device of FIG. 2A.

DETAILED DESCRIPTION

Figure 1:
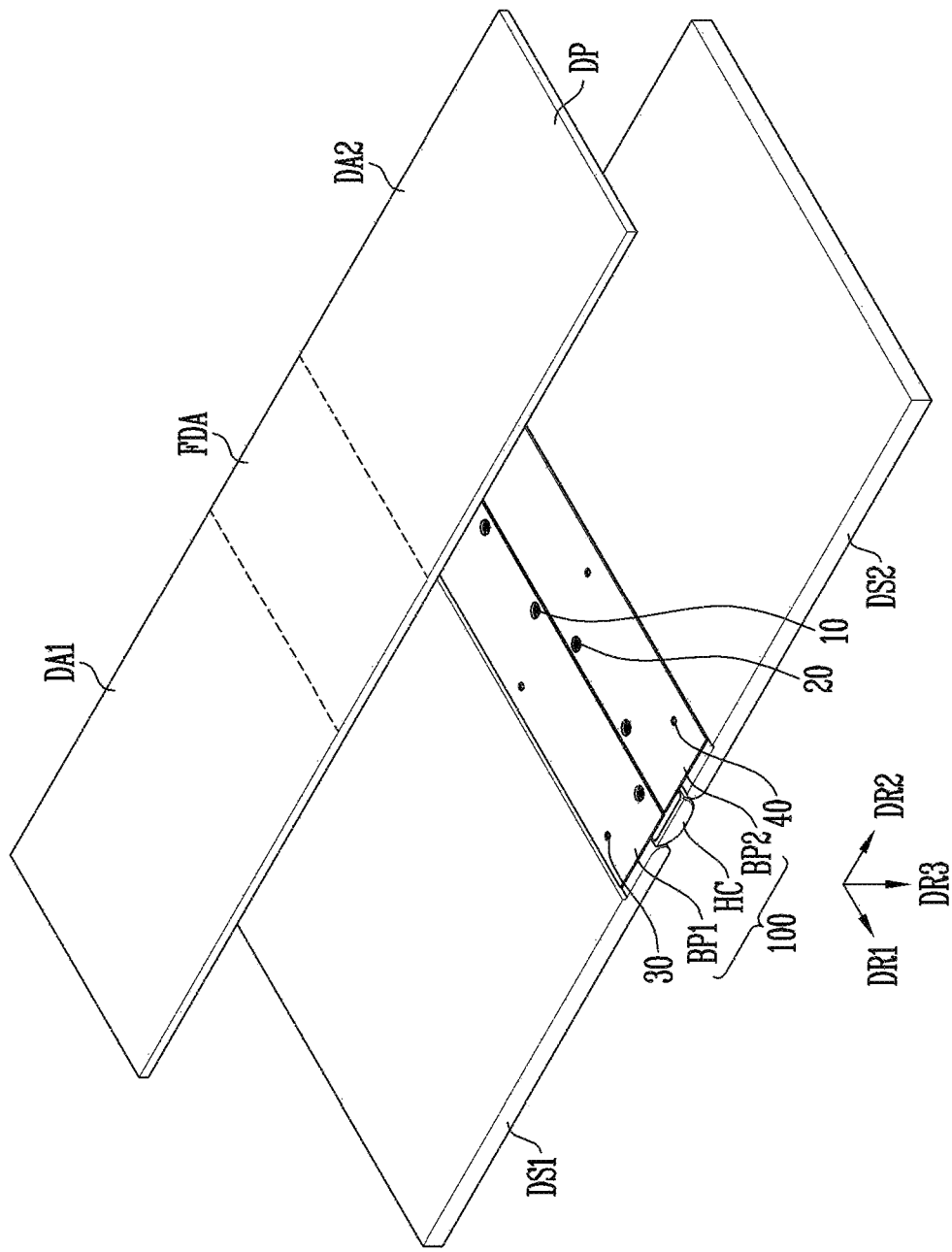
FIG. 1 is a perspective view illustrating a foldable display device according to one or more embodiments of the disclosure.

Herein, some example embodiments of the present disclosure will be described in further detail with reference to the accompanying drawings. The present disclosure may, however, be embodied in different forms and should not be construed as limited to the embodiments set forth herein. The same reference numerals are used for the same components in the drawings, and repetitive descriptions of the same components may be omitted.

It is to be understood that when an element or a layer is referred to as being "on" another element or layer, it may be directly on another element or layer, or one or more intervening elements or layers may also be present.

Although the terms "first," "second," and the like are used to describe various constituent elements, these constituent elements are not limited by these terms. These terms are used to distinguish one constituent element from another constituent element. Therefore, "first" constituent elements described below may be second constituent elements within the technical spirit of the present invention. When explaining the singular, unless explicitly described to the contrary, it may be interpreted as the plural meaning.

Meanwhile, some of the elements not directly related to the features of the present invention in the drawing may be omitted in order to clearly illustrate the present invention. In addition, some of the elements in the drawings may be shown in somewhat exaggerated sizes, ratios, and the like. For the same or similar constituent elements throughout the drawings, the same reference numerals and symbols may be provided even if they are displayed on different drawings, and duplicate descriptions may be omitted.

It is to be further understood that the terms "comprises" and/or "comprising" used herein specify the presence of stated features or components, but do not preclude the presence or addition of one or more other features or components.

In embodiments set forth herein, when a layer, area, or component is connected to another layer, area, or component, the layers, areas, or components may be directly connected to each other, and the layers, areas, or components may also be indirectly connected to each other with another layer, area, or component therebetween.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a perspective view illustrating a foldable display device according to one or more embodiments of the disclosure.

Referring to FIG. 1, the foldable display device may include a display panel DP, a first panel support member DS1, a second panel support member DS2, and a hinge device 100.

As shown in FIG. 1, the foldable display device may display an image on a display surface (for example, shown as FDA, DA1, and DA2). The display surface in a fully unfolded (flat) state of the foldable display device is parallel to a surface defined by a first direction axis (herein, a first direction DR1) and a second direction axis (herein, a second direction DR2). A third direction axis (herein, a third direction DR3) indicates a normal direction of the display surface, that is, a thickness direction of the display panel DP.

However, the first to third directions DR1, DR2, and DR3 shown in the present embodiment are merely examples, and the directions indicated by the first to third directions DR1, DR2, and DR3 are relative concepts, and may be converted into different directions.

In an embodiment, the foldable display device may be folded in an in-folding manner in which the display surfaces are folded to face each other. However, this is an example, and the foldable display device may include an out-folding area and may include a plurality of folding areas.

In an embodiment, the foldable display device of FIG. 1 may have a folding axis parallel to the first direction DR1. For example, the foldable display device may be applied to an electronic apparatus that is folded left and right.

The display panel DP may be a flexible display panel. For example, the display panel DP may include a flexible substrate, such as a plastic film, and may display an image by using a pixel circuit (e.g., a plurality of transistors) disposed on the flexible substrate and a light emitting element, such as an organic light emitting diode. The light emitting element and the pixel circuit may be covered with a thin film encapsulation layer. The thin film encapsulation layer may seal the light emitting element from an external air environment including water and oxygen, thereby suppressing characteristic deterioration. Here, the light emitting element is not limited to the organic light emitting diode. For example, the light emitting element may be an inorganic light emitting element including an inorganic light emitting material or a light emitting element (quantum dot display element) that emits light by changing a wavelength of light emitted using a quantum dot.

The display panel DP may include a display area formed of pixels. The display area may include a first display area DA1, a second display area DA2, and a foldable display area FDA between the first display area DA1 and the second display area DA2. The foldable display area FDA may include a portion (for example, a bent portion) that may be substantially changed in shape by the hinge device 100.

In an embodiment, the foldable display device may further include an input sensing sensor disposed on the display surface of the display panel DP or embedded in the display panel DP. In an embodiment, the input sensing sensor may include any of a touch sensor, a fingerprint sensor, a motion sensor, an iris sensor, and the like.

A transparent cover window may be provided outside the display surface of the display panel DP. The cover window protects the display panel DP from an external impact, a scratch, and the like, while transmitting the image of the display panel DP as is. In an embodiment, the cover window may include a transparent material having rigidity and flexibility.

In an embodiment, the first and second panel support members DS1 and DS2 may include a metal or plastic material. The first and second panel support members DS1 and DS2 may be attached to surfaces opposite to the display surface of the display panel DP.

The first panel support member DS1 may support a first area of the display panel DP including the first display area DA1. The second panel support member DS2 may support a second area of the display panel DP including the second display area DA2. In an embodiment, the first and second panel support members DS1 and DS2 may be attached to a surface of the display panel DP by an adhesive.

The first and second panel support members DS1 and DS2 may support the display panel DP and allow the display panel DP to maintain a constant shape. The first and second panel support members DS1 and DS2 cause the display panel DP to maintain a flat shape when the foldable display device is unfolded and cause the display panel DP to maintain a constant folded shape when the foldable display device is folded. In addition, the first and second panel support members DS1 and DS2 may protect the display panel DP from an external impact, contamination, and the like.

In an embodiment, another surface of the first and second panel support members DS1 and DS2 forming an appearance of the foldable display device may include a flat surface or have at least one curved surface.

The first panel support member DS1 may be coupled to a first base plate BP1. The second panel support member DS2 may be coupled to a second base plate BP2. The first and second panel support members DS1 and DS2 may be moved in conjunction with (dependently to) rotation (rotating movement) of the first and second base plates BP1 and BP2.

The hinge device 100 may include the first base plate BP1, the second base plate BP2, and a hinge cover HC. The hinge device 100 may further include a plurality of members disposed in the hinge cover HC to directly rotate the first and second base plates BP1 and BP2. For example, the hinge device 100 may include components such as a rotor, a follower, a bracket, and the like. A configuration and an operation of the hinge device 100 according to one or more embodiments will be described in further detail with reference to FIGS. 2 to 11C.

In an embodiment, the hinge device 100 may be formed in a two-axes hinge structure. The two-axes hinge structure has two rotation axes, and the first and second base plates BP1 and BP2 may rotate based on their respective rotation axes.

In an embodiment, the first and second base plates BP1 and BP2 may include a metal or plastic material.

The first base plate BP1 may overlap a portion of the foldable display area FDA to guide folding and unfolding of the display panel DP. The second base plate BP2 may overlap another portion of the foldable display area FDA to guide the folding and the unfolding of the display panel DP together with the first base plate BP1. In an embodiment, the first base plate BP1 and the second base plate BP2 may concurrently (e.g., simultaneously) rotate at a same angle in directions opposite to each other.

In an embodiment, the first and second base plates BP1 and BP2 may include a plurality of fastening holes 10, 20, 30, and 40. Each of the first and second base plates BP1 and BP2 may be connected to or coupled with another member by a fixing pin or a fixing screw passing through the fastening holes 10, 20, 30, and 40.

For example, the first base plate BP1 and a rotor inside the hinge cover HC may be coupled to each other through a first fastening hole 10. In addition, the second base plate BP2 and another rotor inside the hinge cover HC may be coupled to each other through a second fastening hole 20.

The first panel support member DS1 may be coupled to the first base plate BP1. In an embodiment, a portion of the first panel support member DS1 may be disposed under the first base plate BP1. For example, the first base plate BP1 and the first panel support member DS1 may be coupled to each other through a third fastening hole 30.

Similarly, the second panel support member DS2 may be coupled to the second base plate BP2. The second base plate BP2 and the second panel support member DS2 may be coupled to each other through a fourth fastening hole 40.

In an embodiment, the hinge cover HC may include a metal or plastic material. The hinge cover HC may restrain (support) and protect internal components that substantially perform a hinge operation.

The foldable display device according to embodiments of the disclosure may be symmetrically folded and unfolded by disposition and interaction of components included in the hinge device 100.

Figure 2A:
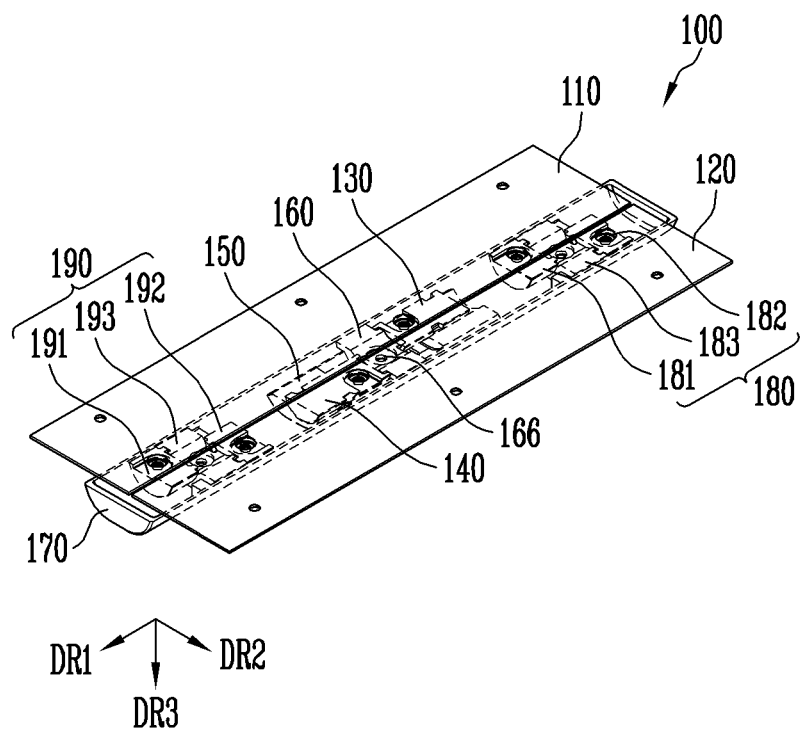
FIG. 2A is a perspective view illustrating an example of a portion of a hinge device included in the foldable display of FIG. 1.

FIG. 2A is a perspective view illustrating an example of a portion of the hinge device included in the foldable display of FIG. 1; and FIG. 2B is an exploded perspective view illustrating an example of a portion of the hinge device of FIG. 2A.

Referring to FIGS. 2A and 2B, in an embodiment, the hinge device 100 may include a first base plate 110, a second base plate 120, a first rotor 130, a second rotor 140, a follower 150 (or a slider), a bracket 160, and a hinge cover 170. In an embodiment, the hinge device 100 may further include first and second folding auxiliary members 180 and 190.

In an embodiment, the components included in the hinge device 100 may include a metal and/or a plastic material.

The first base plate 110 may overlap the portion of the foldable display area FDA to guide the folding and the unfolding of the display panel DP. The first base plate 110 may include the fastening holes 10 of FIG. 1 for coupling with the first rotor 130 and auxiliary rotors 181 and 191. In addition, the first base plate 110 may include the fastening holes 30 of FIG. 1 for coupling with the first panel support member DS1.

The second base plate 120 may overlap the other portion of the foldable display area FDA to guide the folding and the unfolding of the display panel DP. The second base plate 120 may include the fastening holes 20 of FIG. 1 for coupling with the second rotor 140 and auxiliary rotors 182 and 192. In addition, the second base plate 120 may include the fastening holes 40 of FIG. 1 for coupling with the second panel support member DS2.

In an embodiment, the first and second base plates 110 and 120 may be disposed symmetrically with each other.

The first rotor 130 may be coupled to the first base plate 110 and may be disposed to rotate around a first virtual rotation axis. The first rotor 130 may be disposed on the follower 150.

In an embodiment, the first rotor 130 may have a shape in which a portion of a cylinder is vertically cut. That is, the first rotor 130 may include a curved surface having a diameter corresponding to the first virtual rotation axis. A surface of the curved surface of the first rotor 130 may include a first groove 132 of a spiral shape.

A side surface 134 of the first rotor 130 may be coupled to the bracket 160. For example, the side surface 134 of the first rotor 130 may include a protruded portion of an arc shape. The protruded portion of the first rotor 130 may be engaged with a first side portion 162 of the bracket 160. For example, the protruded portion of the arc shape of the side surface 134 of the first rotor 130 may be coupled to the first side portion 162 of the bracket 160 so as to be inserted into the first side portion 162 of the bracket 160. Therefore, the first rotor 130 may be rotated in subordination to (dependent upon) a shape of the first side portion 162 of the bracket 160. That is, the first side portion 162 of the bracket 160 may guide a rotation path of the first rotor 130.

In an embodiment, the first rotor 130 may include a hole 136 corresponding to the fastening hole 10 of FIG. 1 of the first base plate 110. The first rotor 130 and the first base plate 110 may be coupled with each other by coupling a fixing pin or a fixing screw to the fastening hole 10 of FIG. 1 and the hole 136.

The second rotor 140 may be coupled to the second base plate 120 and may be disposed to rotate around a second virtual rotation axis. The second rotor 140 may be disposed on the follower 150.

The second rotor 140 may have a shape substantially the same as that of the first rotor 130 and may include a second groove 142 of a spiral shape on a surface of a curved shape. However, the second groove 142 of the second rotor 140 may be formed in a direction opposite to the first groove 132 of the first rotor 130. That is, directions of spirals of the first and second grooves 132 and 142 may be opposite to each other.

According to an embodiment, a cross-section of the first and second grooves 132 and 142 may have a rectangular or trapezoidal shape.

A side surface 144 of the second rotor 140 may be engaged with a second side portion 164 of the bracket 160. For example, a protruded portion of an arc shape of the side surface 144 of the second rotor 140 may be coupled to the second side portion 164 of the bracket 160 so as to be inserted into the second side portion 164 of the bracket 160. Therefore, the second rotor 140 may be rotated in subordination to (dependent upon) the shape of the second side portion 164 of the bracket 160. That is, the second side portion 164 of the bracket 160 may guide a rotation path of the second rotor 140.

In an embodiment, the second rotor 140 may include a hole 146 corresponding to the fastening hole 20 of FIG. 1 of the second base plate 120. The second rotor 140 and the second base plate 120 may be coupled with each other by coupling a fixing pin or a fixing screw to the fastening hole 20 of FIG. 1 and the hole 146.

In an embodiment, the first rotor 130 and the second rotor 140 may rotate at the same time in directions opposite to each other.

The follower 150 may be disposed between the bracket 160 and the hinge cover 170. The follower 150 may be limited in movement in a direction other than the first direction DR1 by the bracket 160. The first direction DR1 may be a direction parallel to the rotation axes and folding axis.

In an embodiment, the follower 150 may be disposed to overlap with the first rotor 130, the second rotor 140, and the bracket 160. The follower 150 may be in contact with the first and second rotors 130 and 140. The follower 150 may be reciprocated in the first direction DR1 by rotation of the first and second rotors 130 and 140.

The follower 150 may include first and second pins 152 and 154. In FIG. 2B, the first and second pins 152 and 154 are shown separated from the follower 150, but this is illustrative, and, in an embodiment, the first and second pins 152 and 154 may be formed integrally with the follower 150.

The first pin 152 may be disposed to be inserted into the first groove 132 and may be moved in the first groove 132 in subordination to (dependent upon) the rotation of the first rotor 130. The second pin 154 may be disposed to be inserted into the second groove 142 and may be moved in the second groove 142 in subordination to (dependent upon) the rotation of the second rotor 140.

The first and second pins 152 and 154 may convert the rotation (or rotation motion) of the first and second rotors 130 and 140 into a straight line motion of the follower 150. That is, movements of the first rotor 130, the second rotor 140, and the follower 150 may be restrained to each other to act on each other. In an embodiment, a cross-sectional shape of the first pin 152 and the second pin 154 may be a rectangular shape or a trapezoidal shape corresponding to the first and second grooves 132 and 142, respectively.

For example, the first and second rotors 130 and 140 may rotate in opposite directions by the folding or the unfolding of the foldable display device. The rotation of the first and second rotors 130 and 140 causes a force to be applied to the first and second pins 152 and 154, and, thus, the follower 150 may be pushed in the first direction DR1 or a direction opposite to the first direction DR1. In addition, the first and second rotors 130 and 140 may be concurrently (e.g., simultaneously) rotated by the same rotation amount by restraint force of the follower 150. That is, the first rotor 130, the second rotor 140, and the follower 150 may mutually operate similarly to a cylindrical cam driving principle or a lead screw driving principle.

The bracket 160 may be coupled to the first and second rotors 130 and 140. The bracket 160 may guide the rotation paths of each of the first and second rotors 130 and 140. In an embodiment, the bracket 160 may be disposed to be inserted into the hinge cover 170. The bracket 160 may limit the movement of the follower 150 in a direction other than the first direction DR1.

In an embodiment, the bracket 160 may include the first side portion 162, the second side portion 164, and a fixing hole 166.

The first side portion 162 may be disposed to engage with the side surface 134 of the first rotor 130. The rotation path of the first rotor 130 may be guided based on a shape of the first side portion 162 and a coupling form of the first side portion 162 and the first rotor 130.

The second side portion 164 may correspond to an opposite side of the first side portion 162. The second side portion 164 may be disposed to engage with the side surface 144 of the second rotor 140. The rotation path of the second rotor 140 may be guided based on a shape of the second side portion 164 and a coupling form of the second side portion 164 and the second rotor 140.

A fixing member (for example, a fixing pin, a fixing screw, or the like) for coupling and fixing the bracket 160 to the hinge cover 170 may be inserted into the fixing hole 166.

The hinge cover 170 may be coupled to the bracket 160 to limit the movement of the follower 150 in the direction other than the first direction DR1. The hinge cover 170 may include at least one protrusion portion into which the follower 150, the bracket 160, and the like are inserted, and a groove into which the follower 150, the bracket 160, and the like are inserted and coupled.

In an embodiment, the hinge device 100 may further include the first and second folding auxiliary members 180 and 190. The first and second folding auxiliary members 180 and 190 may perform functions of assisting and reinforcing hinge coupling of the first and second rotors 130 and 140 and the first and second base plates 110 and 120, respectively. For example, the first and second folding auxiliary members 180 and 190 may be disposed on the hinge cover 170 to be spaced apart from the first and second rotors 130 and 140, and may be coupled to the first and second base plates 110 and 120.

The first folding auxiliary member 180 may include a first auxiliary rotor 181, a second auxiliary rotor 182, and a first auxiliary bracket 183 disposed between the first auxiliary rotor 181 and the second auxiliary rotor 182.

The first auxiliary rotor 181 may be coupled to the first base plate 110 and may rotate equally with the first rotor 130. The second auxiliary rotor 182 may be coupled to the second base plate 120 and may rotate equally with the second rotor 140.

The first auxiliary bracket 183 may guide rotation paths of the first and second auxiliary rotors 181 and 182 and may limit movements other than rotation motion of the first and second auxiliary rotors 181 and 182.

The second folding auxiliary member 190 may include a third auxiliary rotor 191, a fourth auxiliary rotor 192, and a second auxiliary bracket 193 disposed between the third auxiliary rotor 191 and the fourth auxiliary rotor 192.

The third auxiliary rotor 191 may be coupled to the first base plate 110 and may rotate equally with the first rotor 130. The fourth auxiliary rotor 192 may be coupled to the second base plate 120 and may rotate equally with the second rotor 140.

The second auxiliary bracket 193 may guide rotation paths of the third and fourth auxiliary rotors 191 and 192 and may limit movements other than rotation motion of the third and fourth auxiliary rotors 191 and 192.

The first and third auxiliary rotors 181 and 191 may assist the rotation (hinge drive) of the first base plate 110. The second and fourth auxiliary rotors 182 and 192 may assist the rotation (hinge drive) of the second base plate 120.

Since a rotation method of the first to fourth auxiliary rotors 181, 182, 191, and 192 may be substantially the same as that of the first and second rotors 130 and 140 by the bracket 160, repetitive descriptions is omitted.

As described above, the foldable display device including the hinge device 100 according to embodiments of the disclosure may perform folding and unfolding using a two-axes hinge structure through interaction of the rotation motion of the first rotor 130 and the second rotor 140 and the straight line motion of the follower 150. Therefore, folding/unfolding angles of the first base plate 110 (and the first panel support member DS1) and the second base plate 120 (and the second panel support member DS2) coincide, and symmetrical folding/unfolding of the foldable display device may be implemented. In addition, a manufacturing cost may be reduced by eliminating a configuration including a complicated driving mechanism and a plurality of sophisticated gears, springs, and/or the like, and implementing a two-axes hinge mechanism based on the coupling of the first rotor 130, the second rotor 140, and the follower 150.

Figure 3:
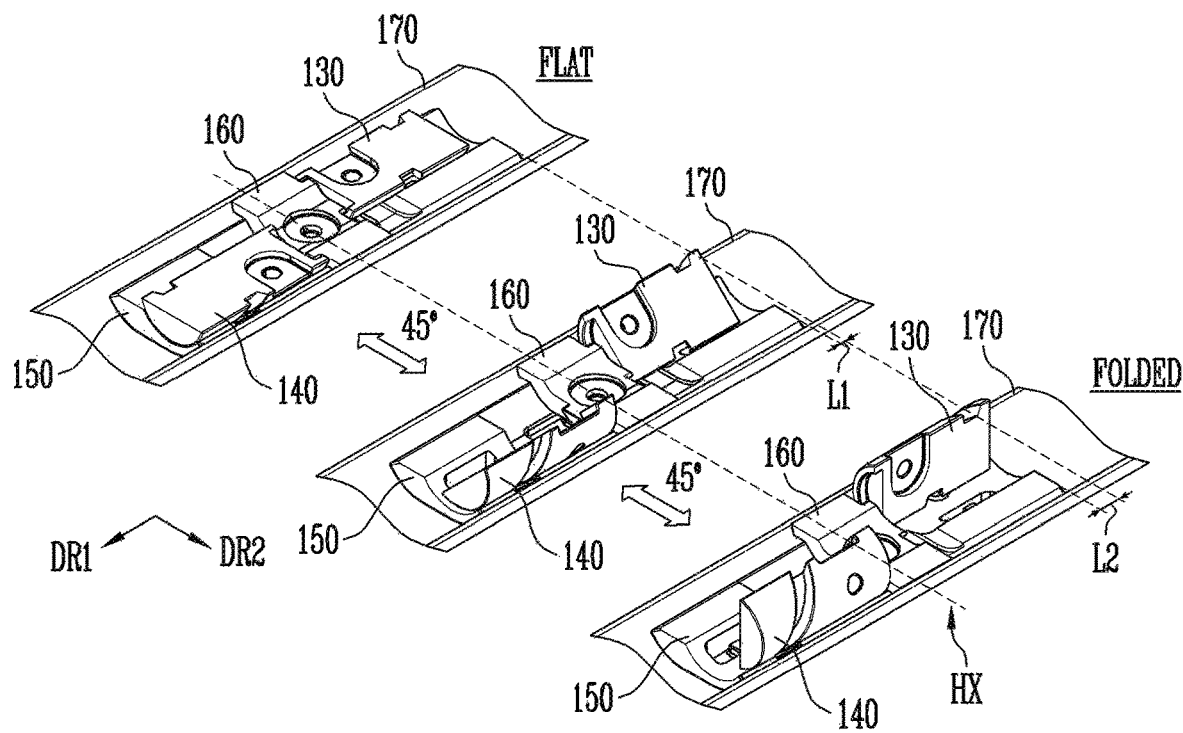
FIG. 3 is a perspective view illustrating an example of a method of driving the hinge device of FIG. 2A.
Figure 4A:
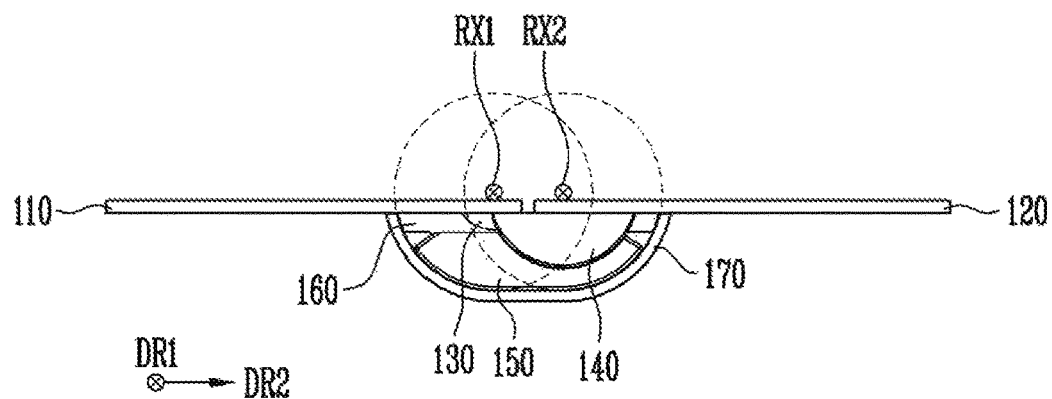
FIGS. 4A to 4C are diagrams schematically illustrating an example of the method of driving the hinge device of FIG. 3.
Figure 4B:
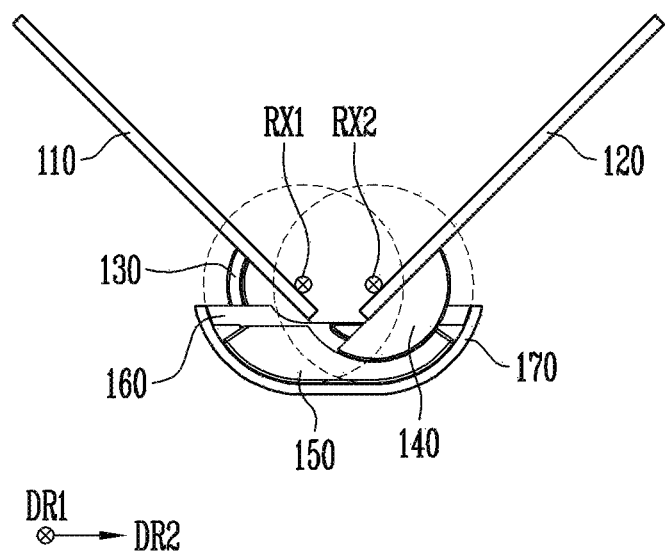
Figure 4C:
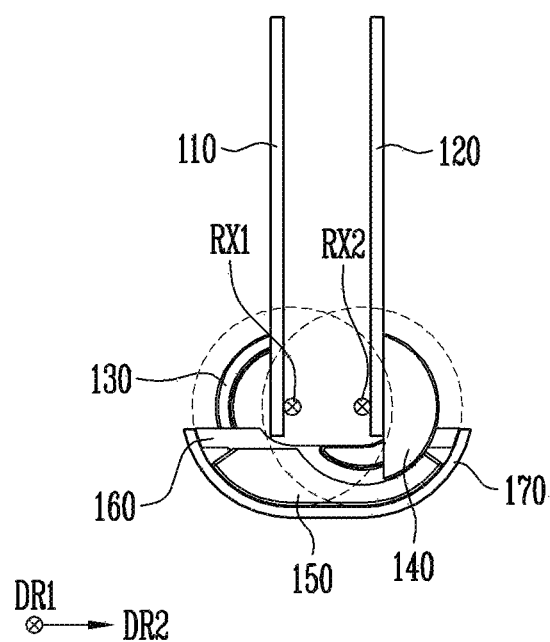

FIG. 3 is a perspective view illustrating an example of a method of driving the hinge device of FIG. 2A; and FIGS. 4A to 4C are diagrams schematically illustrating an example of the method of driving the hinge device of FIG. 3.

For example, FIGS. 4A to 4C show a schematic planar shape of the hinge device of FIG. 3 as viewed in the first direction DR1.

Referring to FIGS. 1 to 4C, the first rotor 130 and the second rotor 140 of the hinge device 100 may be concurrently (e.g., simultaneously) rotated in opposite directions, and, thus, the foldable display device may be folded or unfolded.

In a state in which the foldable display device is fully unfolded (denoted by FLAT in FIG. 3), as shown in FIG. 4A, a horizontal surface of the first and second rotors 130 and 140 may be positioned to be parallel to the foldable display device. The horizontal surface of the first and second rotors 130 and 140 may be a surface opposite each curved surface.

When the foldable display device is folded at an angle (e.g., a predetermined angle), the first and second rotors 130 and 140 may rotate in opposite directions. For example, the first rotor 130 may rotate in a clockwise direction about a first virtual rotation axis RX1, and the second rotor 140 may rotate in a counterclockwise direction about a second virtual rotation axis RX2. In contrast, when the foldable display device is unfolded, the first rotor 130 may rotate in a counterclockwise direction, and the second rotor 140 may rotate in a clockwise direction.

A position of the first pin 152 may be changed in the first groove 132 by the rotation of the first rotor 130, and a position of the second pin 154 may be changed in the second groove 142 by the rotation of the second rotor 140. Since each of the first and second grooves 132 and 142 has a spiral shape toward the first direction DR1, rotation force of the first and second rotors 130 and 140 may be transferred to the follower 150 in the first direction DR1 through the first and second pins 152 and 154. Therefore, the follower 150 may move in the first direction DR1.

For example, as shown in FIGS. 3 and 4B, when the foldable display device is folded at about 45°, the follower 150 horizontally moves (or slides) in the first direction DR1 by a first length L1. In addition, the follower 150 may prevent or substantially prevent the first and second rotors 130 and 140 from rotating at different rotation amounts (or rotation angles).

In addition, as shown in FIG. 4C, when the foldable display device is fully folded (denoted by FOLDED in FIG. 3, for example, when the foldable display device is folded at about 90°, the follower 150 may move in the first direction DR1 by a second length L2 as compared to when the foldable display device is fully unfolded by the rotation of the first and second rotors 130 and 140.

However, at the time of the folding/unfolding of the foldable display device, the bracket 160 may be fixed about a horizontal axis HX, and only the follower 150 may reciprocate in the first direction DR1 under the bracket 160.

As described above, the hinge device 100 and the foldable display device including the same according to embodiments of the disclosure may be symmetrically folded/unfolded using a simple connection structure of the first rotor 130, the second rotor 140, and the follower 150.

Figure 5A:
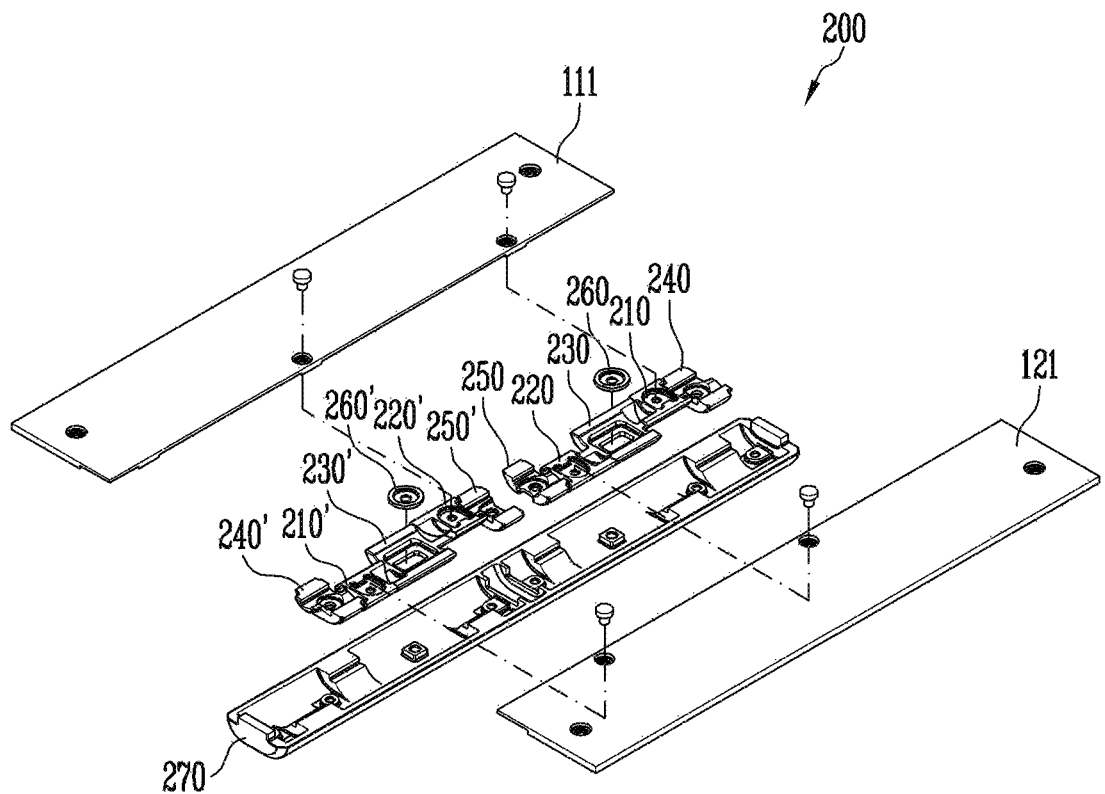
FIG. 5A is an exploded perspective view illustrating an example of a portion of a hinge device included in the foldable display of FIG. 1.
Figure 5B:
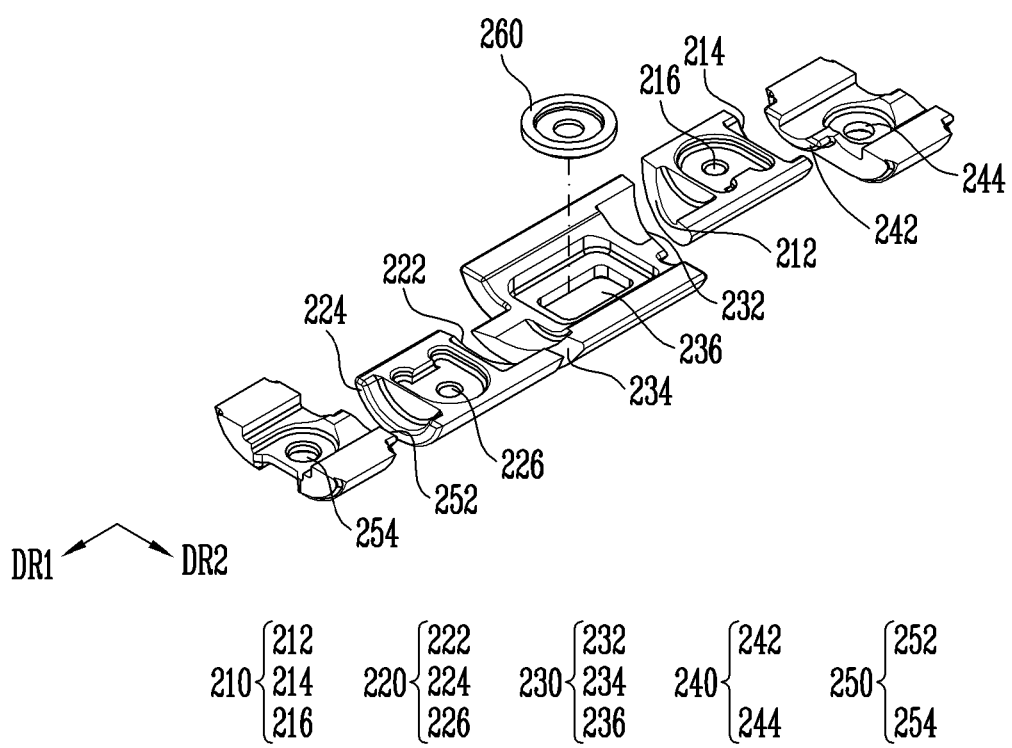
FIG. 5B is an exploded perspective view illustrating an example of a portion of the hinge device of FIG. 5A.

FIG. 5A is an exploded perspective view illustrating an example of a portion of a hinge device included in the foldable display of FIG. 1; and FIG. 5B is an exploded perspective view illustrating an example of a portion of the hinge device of FIG. 5A.

Referring to FIGS. 1, 5A, and 5B, a hinge device 200 may include a first base plate 111, a second base plate 121, a first hinge group HG1, a second hinge group HG2, and a hinge cover 270.

In an embodiment, the first hinge group HG1 may include a first rotor 210, a second rotor 220, a follower 230, a first bracket 240, and a second bracket 250. The first hinge group HG1 may further include a washer 260 for preventing or substantially preventing shaking or twisting of the follower 230 from the hinge cover 270.

A first side surface 212 of the first rotor 210 may be in surface contact with a first side surface 232 of the follower 230. For example, the first side surface 212 of the first rotor 210 and the first side surface 232 of the follower 230 may correspond to respective cross-sections separated by a member of an arc shape, which is cut in an oblique direction. Therefore, in a state in which the foldable display device is fully unfolded, a surface where the first side surface 212 of the first rotor 210 and the first side surface 232 of the follower 230 are in contact with each other may coincide.

A second side surface 214 of the first rotor 210 may be engaged with a side portion 242 of the first bracket 240. Since a coupling form of the first rotor 210 and the first bracket 240 may be substantially the same as the coupling form and the driving mechanism of the rotor and the bracket described with reference to FIGS. 2A to 4C, repetitive descriptions may be omitted. Similarly, a coupling form and a driving mechanism of the second rotor 220 and the second bracket 250 may also be the same.

The first rotor 210 may include a hole 216 corresponding to a fastening hole of the first base plate 111. As a fixing pin or a fixing screw is coupled to the fastening hole and the hole 216, the first rotor 210 and the first base plate 111 may be coupled to each other.

A first side surface 222 of the second rotor 220 may be in surface contact with a second side surface 234 of the follower 230. For example, the first side surface 222 of the second rotor 220 and the second side surface 234 of the follower 230 may correspond to respective cross-sections separated by a member of an arc shape, which is cut in an oblique direction. Therefore, in a state in which the foldable display device is fully unfolded, a surface where the first side surface 222 of the second rotor 220 and the second side surface 234 of the follower 230 are in contact with each other may coincide. Accordingly, each of the first side surface 232 and the second side surface 234 of the follower 230 may be formed to have a surface inclined with respect to the second direction DR2.

A second side surface 224 of the second rotor 220 may be engaged with a side portion 252 of the second bracket 250. The second rotor 220 may include a hole 226 corresponding to a fastening hole of the second base plate 121. As a fixing pin or a fixing screw is coupled to the fastening hole and the hole 226, the second rotor 220 and the second base plate 121 may be coupled to each other.

The follower 230 may be disposed between the first and second rotors 210 and 220. The follower 230 may be reciprocated in the first direction DR1 by rotation of the first and second rotors 210 and 220.

The follower 230 may be limited to twisting or movement in a direction other than the first direction DR1 by the washer 260. In addition, the follower 230 may further include a hole 236 receiving a protrusion portion of the hinge cover 270.

The first bracket 240 may be disposed to engage with the second side surface 214 of the first rotor 210. The first bracket 240 may guide a rotation path of the first rotor 210. The first bracket 240 may include a fixing hole 244 for fixing the first bracket 240 to the hinge cover 270.

The second bracket 250 may be disposed to engage with the second side surface 224 of the second rotor 220. The second bracket 250 may guide a rotation path of the second rotor 220. The second bracket 250 may include a fixing hole 254 for fixing the second bracket 250 to the hinge cover 270.

The first and second brackets 240 and 250 may prevent or substantially prevent the first and second rotors 210 and 220 and the follower 230 from moving in a direction other than a path (e.g., a predetermined path). Since a shape and a coupling form of the first and second brackets 240 and 250 are described with reference to FIGS. 2A to 4C, repetitive descriptions will be omitted.

The second hinge group HG2 may be disposed to be spaced apart from the first hinge group HG1. In an embodiment, the second hinge group HG2 may include a same configuration as the first hinge group HG1. For example, the second hinge group HG2 may also include a third rotor 210', a fourth rotor 220', a follower 230', a third bracket 240', and a fourth bracket 250'.

The second hinge group HG2 may be disposed on the hinge cover 270 in a shape corresponding to the first hinge group HG1 being rotated about 180° on a plane.

Figure 6:
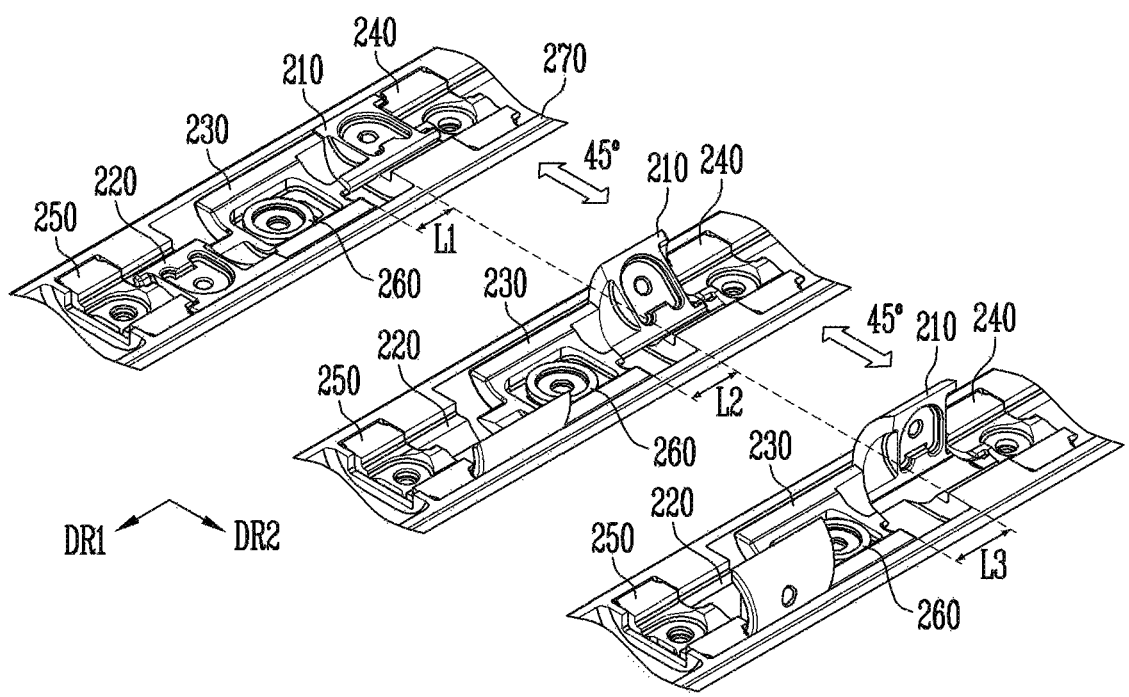
FIG. 6 is a perspective view illustrating an example of a method of driving the hinge device of FIG. 5A.

FIG. 6 is a perspective view illustrating an example of a method of driving the hinge device of FIG. 5A.

Referring to 5A to 6, the first rotor 210 and the second rotor 220 of the hinge device 200 may concurrently (e.g., simultaneously) rotate in directions opposite to each other, and, thus, the foldable display device may be folded or unfolded.

In a state in which the foldable display device is completely unfolded, a horizontal surface of the first and second rotors 210 and 220 may be positioned to be parallel to the foldable display device. The horizontal surface of the first and second rotors 210 and 220 may be a surface or face opposite each curved surface. In this case, the follower 230 may be disposed to be spaced apart from a reference point (e.g., a predetermined reference point) on the hinge cover 270 by a first length L1.

When the foldable display device is folded, the first rotor 210 may rotate in a clockwise direction and the second rotor 220 may rotate in a counterclockwise direction.

As a center of the hinge cover 270 with respect to the second direction DR2, a length is longer in the first direction DR1 of the first side surface 212 of the first rotor 210. On the other hand, the first side surface 232 of the follower 230 that is in contact with the first rotor 210 has an outer side longer than a center side of the hinge cover 270. Therefore, when the first rotor 210 rotates in the clockwise direction, force pushing the follower 230 in the first direction DR1 may be generated by the contact between the first side surface 212 of the first rotor 210 and the first side surface 232 of the follower 230.

Therefore, when the foldable display device is folded, the follower 230 may be moved (or slide) in the first direction DR1 by the rotation of the first rotor 210. That is, the first rotor 210 (and the second rotor 220) and the follower 230 may perform folding/unfolding by a mechanism similar to an end cam driving method using surface contact.

For example, as the foldable display device is further folded, a length (or distance) between the follower 230 and the reference point on the hinge cover 270 may increase. That is, as shown in FIG. 6, a third length L3 may be greater than a second length L2, and the second length L2 may be greater than the first length L1.

In an embodiment, in a folding operation by the first hinge group HG1, force acting on the follower 230 by rotation force of the second rotor 220 may be relatively weaker than force acting on the follower 230 by rotation force of the first rotor 210. In this case, the second base plate 121 may not be fixed to a predetermined folding state.

In order to compensate such a problem, the hinge device 200 may further include the second hinge group HG2 disposed in a direction opposite to the first hinge group HG1. A disposition and a method of driving first and second hinge groups HG1 and HG2 will be described in further detail with reference to FIGS. 7 and 8.

Figure 7:
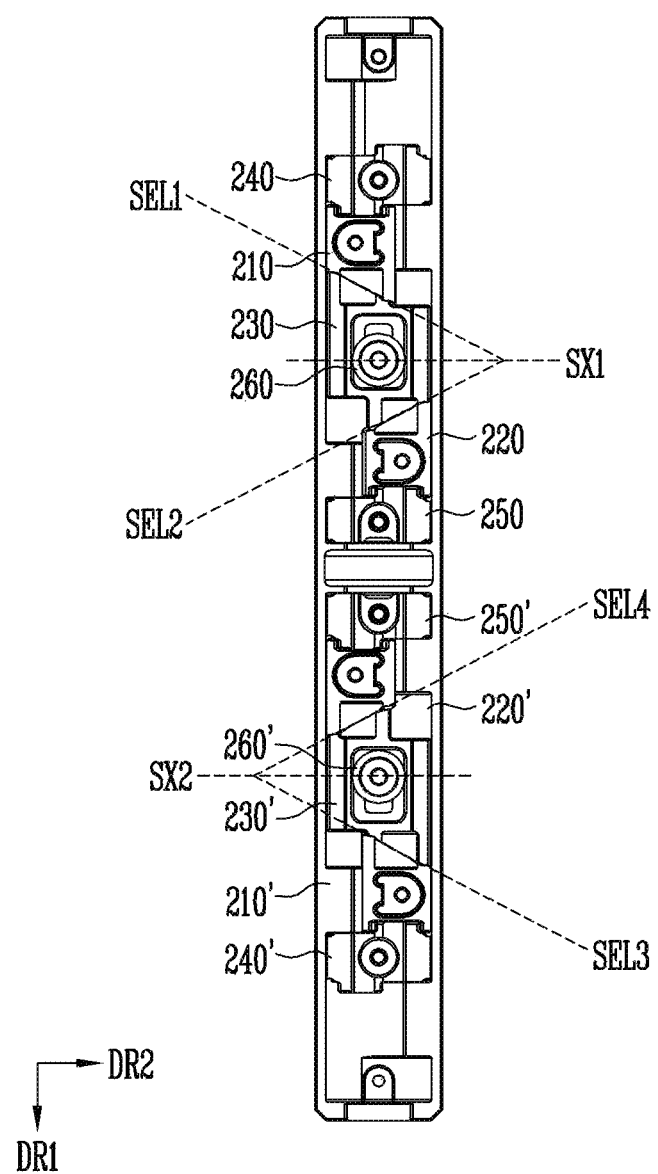
FIG. 7 is a plan view illustrating an example of the hinge device of FIG. 5A.
Figure 8:
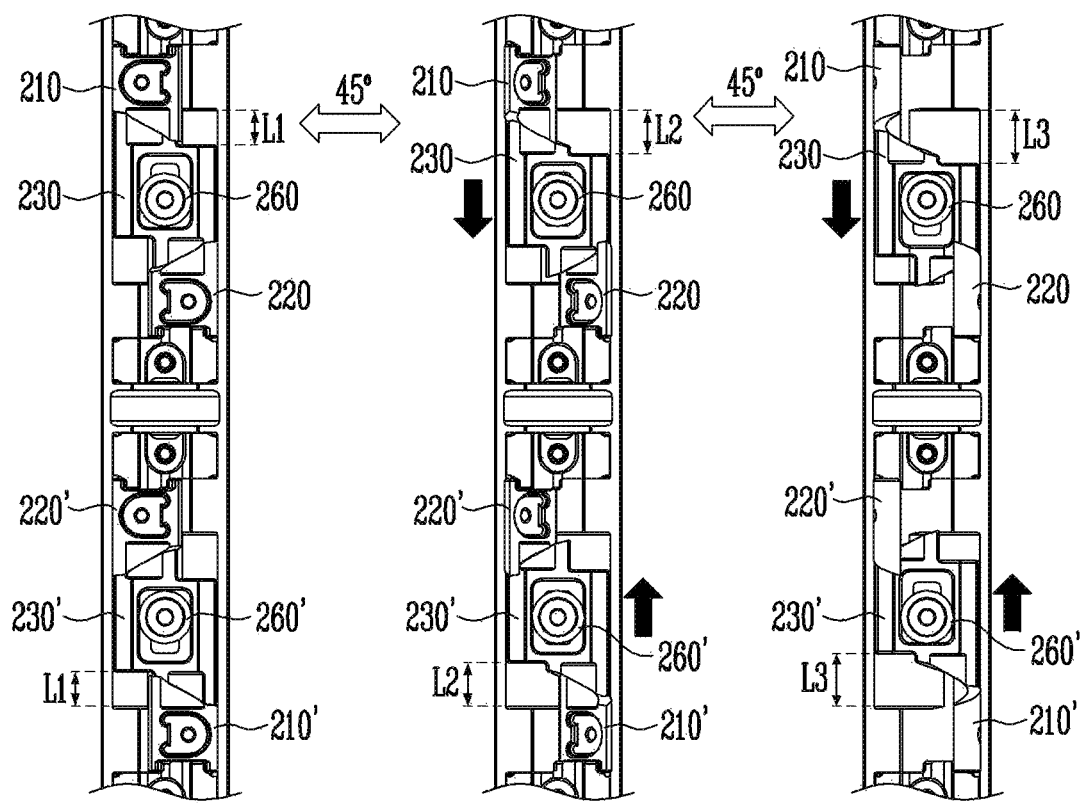
FIG. 8 is a plan view illustrating an example of a method of driving the hinge device of FIG. 7.

FIG. 7 is a plan view illustrating an example of the hinge device of FIG. 5A; and FIG. 8 is a plan view illustrating an example of a method of driving the hinge device of FIG. 7.

Referring to FIGS. 5A to 7, the hinge device 200 may include the first hinge group HG1 and the second hinge group HG2.

The second hinge group HG2 may have a configuration substantially the same as that of the first hinge group HG1. The second hinge group HG2 may be disposed on the hinge cover 270 in a shape corresponding to the first hinge group HG1 being rotated about 180° on a plane.

For convenience of description, the first hinge group HG1 may include the first rotor 210, the second rotor 220, the follower 230, the first bracket 240, the second bracket 250, and the washer 260, and the second hinge group HG2 may include the third rotor 210', the fourth rotor 220', the follower 230', the third bracket 240', the fourth bracket 250', and a washer 260'. However, the third rotor 210' may be coupled to the second base plate 121, and the fourth rotor 220' may be coupled to the first base plate 111.

FIG. 7 shows a first extension line SEL1 corresponding to a surface extending from the first side surface 232 of the follower 230 and a second extension line SEL2 corresponding to a surface extending from the second side surface 234 of the follower 230. The first extension line SEL1 and the second extension line SEL2 are symmetrical with respect to a first symmetry axis SX1. Here, the first symmetry axis SX1 may be an axis extending in the second direction DR2 based on a center of the follower 230. The second direction DR2 may be substantially perpendicular to the first direction DR1 and may be parallel to the unfolded state of the display panel DP.

Therefore, the first side surface 232 and the second side surface 234 of the follower 230 may be symmetrical with respect to the first symmetry axis SX1.

Similarly, on a plane, a first side surface and a second side surface of the follower 230' of the second hinge group HG2 may be symmetrical with respect to a second symmetry axis SX2. A third extension line SEL3 may be an extension line corresponding to a surface extending from a first side surface of the follower 230' on the plane, and a fourth extension line SEL4 may be an extension line corresponding to a surface extending from a second side surface of the follower 230' on the plane. As shown in FIG. 7, the follower 230' may be disposed in a shape corresponding to the first follower 230 being rotated 180° on a plane.

As shown in FIG. 8, when the foldable display device is folded, the first and fourth rotors 210 and 220' may rotate in a clockwise direction, and the second and third rotors 220 and 210' may rotate in a counterclockwise direction.

The follower 230 may be moved in the first direction DR1 by the rotation of the first rotor 210. As the rotation amount of the first rotor 210 increases, a movement amount in which the follower 230 is moved (slides) from the reference point in the first direction DR1 may increase (for example, L3>L2>L1).

At the same time, the follower 230' may be moved in a direction opposite to the first direction DR1 by rotation of the third rotor 210'. As a rotation amount of the third rotor 210' increases, a movement amount in which the follower 230' is moved (slides) from the reference point in a direction opposite to the first direction DR1 may increase (for example, L3>L2>L1). In an embodiment, the third rotor 210' may limit the rotation of the second base plate 121.

As described above, the hinge device 200 and the foldable display device including the same according to embodiments of the disclosure may perform folding and unfolding in a two-axes hinge structure through interaction of rotation motion of the first to fourth rotors 210, 220, 210', and 220' and a straight line motion of the followers 230 and 230'. Therefore, folding/unfolding angles of the first base plate 111 (and the first panel support member DS1 of FIG. 1) and the second base plate 121 (and the second panel support member DS2 of FIG. 1) coincide, and a symmetrical folding/unfolding of the foldable display device may be implemented.

Figure 9A:
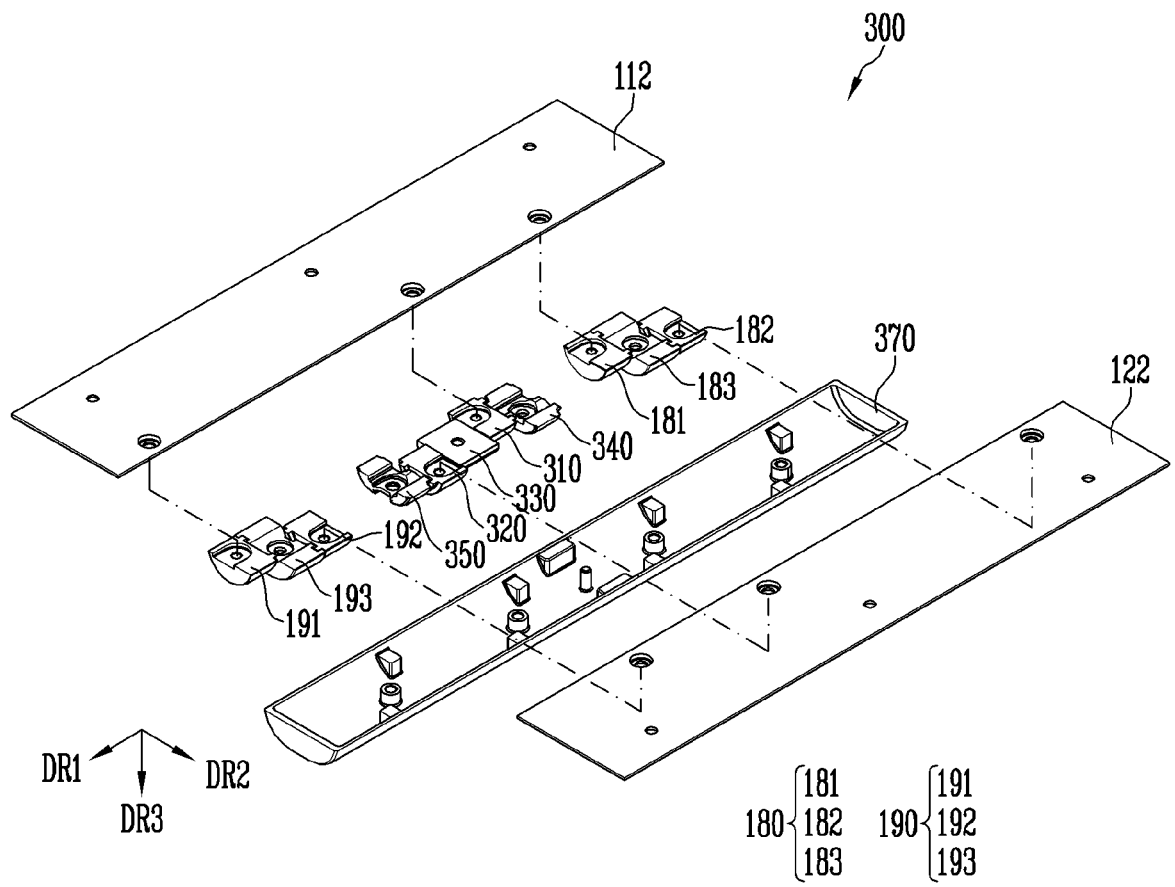
FIG. 9A is an exploded perspective view illustrating an example of a portion of a hinge device included in the foldable display of FIG. 1.
Figure 9B:
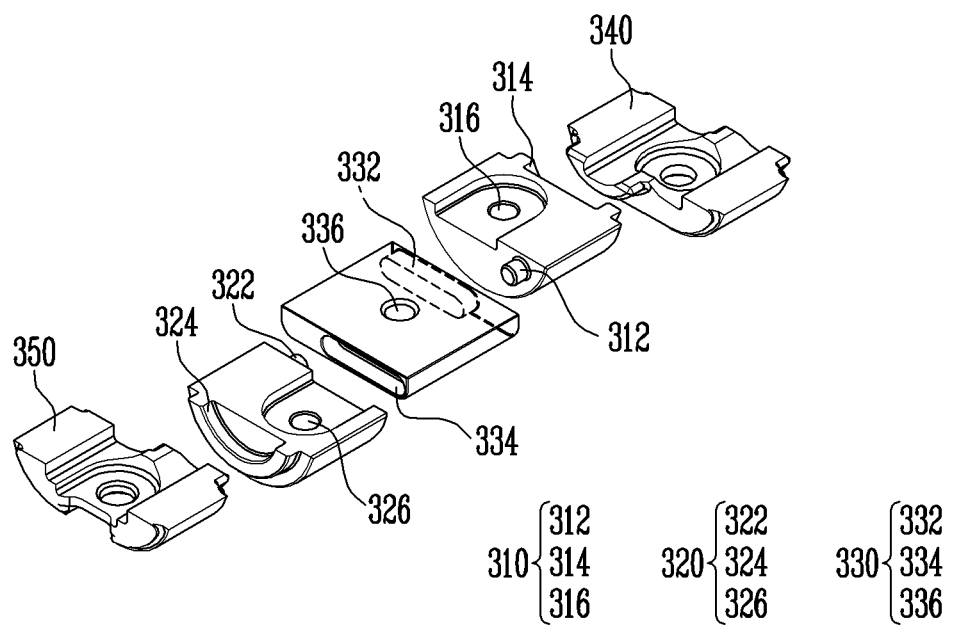
FIG. 9B is an exploded perspective view illustrating an example of a portion of the hinge device of FIG. 9A.

FIG. 9A is an exploded perspective view illustrating an example of a portion of a hinge device included in the foldable display of FIG. 1; and FIG. 9B is an exploded perspective view illustrating an example of a portion of the hinge device of FIG. 9A.

Referring to FIGS. 1, 9A, and 9B, a hinge device 300 may include a first base plate 112, a second base plate 122, a first rotor 310, a second rotor 320, a follower 330, a first bracket 340, a second bracket 350, and a hinge cover 370. In an embodiment, the hinge device 300 may further include first and second folding auxiliary members 180 and 190.

In an embodiment, the follower 330 may be disposed between the first and second rotors 310 and 320. A first side surface of the first rotor 310 may be coupled to the follower 330, and a second side surface 314 of the first rotor 310 may be coupled to the first bracket 340. A first side surface of the second rotor 320 may be coupled to the follower 330, and a second side surface 324 of the second rotor 320 may be coupled to the second bracket 350.

The first rotor 310 may include a first protrusion portion 312 on the first side surface inserted into a first guide hole 332 of the follower 330. The first protrusion portion 312 may be moved in the first guide hole 332 by rotation of the first rotor 310 (that is, a portion that is in contact with an inside of the first guide hole 332 may be changed).

The first rotor 310 may further include a hole 316 corresponding to a fastening hole of the first base plate 112.

The second rotor 320 may have substantially the same shape as the first rotor. The second rotor 320 may include a second protrusion portion 322 on the first side surface inserted into a second guide hole 334 of the follower 330. The second protrusion portion 322 may be moved in the second guide hole 334 by rotation of the second rotor 320 (that is, a portion that is in contact with an inside of the second guide hole 334 may be changed).

The second rotor 320 may further include a hole 326 corresponding to a fastening hole of the second base plate 122.

The follower 330 may include the first guide hole 332 formed in a first side surface that is in contact with the first rotor 310, and the second guide hole 334 formed in a second side surface that is in contact with the second rotor 320. In an embodiment, widths in a horizontal direction of each of the first and second guide holes 332 and 334 may be greater than widths in the vertical direction of each of the first and second guide holes 332 and 334.

The follower 330 may further include a fixing hole 336 for preventing or substantially preventing movement or distortion in a direction other than the vertical direction (for example, the third direction DR3). In an embodiment, a protrusion portion of the hinge cover 370 may be inserted into the fixing hole 336.

The follower 330 may reciprocate in the third direction DR3 (that is, the vertical direction) by rotation motion of the first and second rotors 310 and 320. Movement of the first rotor 310, the second rotor 320, and the follower 330 may be restrained to each other to act on each other. For example, the first rotor 310, the second rotor 320, and the follower 330 may operate similar to a scotch yoke cam driving principle.

The first bracket 340 may be disposed to engage with the second side surface 314 of the first rotor 310. The first bracket 340 may guide a rotation path of the first rotor 310. The second bracket 350 may be disposed to engage with the second side surface 324 of the second rotor 320. The second bracket 350 may guide a rotation path of the second rotor 320.

Since the first and second folding auxiliary members 180 and 190 are described with reference to FIGS. 2A and 2B, repetitive descriptions will be omitted.

As described above, the foldable display device including the hinge device 300 according to embodiments of the disclosure may perform folding and unfolding in a two-axes hinge structure through interaction of rotation motion of the first and second rotors 310 and 320 and a straight line motion of the follower 330. Therefore, folding/unfolding angles of the first base plate 112 (and the first panel support member DS1 of FIG. 1) and the second base plate 122 (and the second panel support member DS2 of FIG. 1) coincide, and a symmetrical folding/unfolding of the foldable display device may be implemented.

Figure 10:
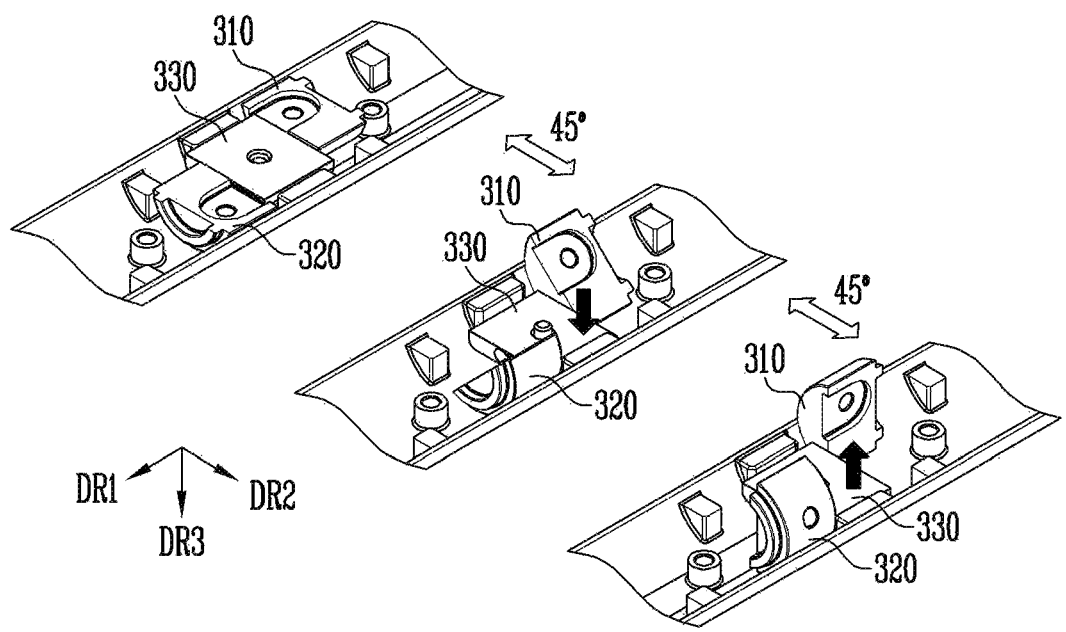
FIG. 10 is a perspective view illustrating an example of a method of driving the hinge device of FIG. 9A.
Figure 11A:
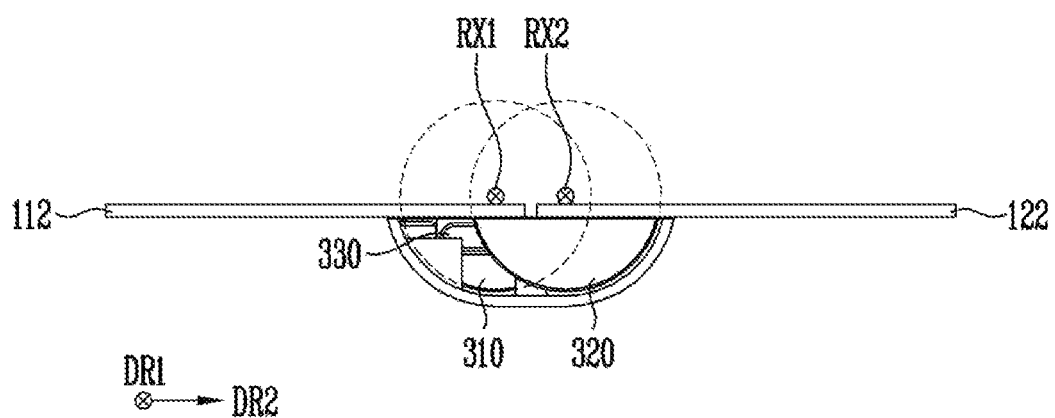
FIGS. 11A to 11C are diagrams schematically illustrating an example of the method of driving the hinge device of FIG. 10.
Figure 11B:
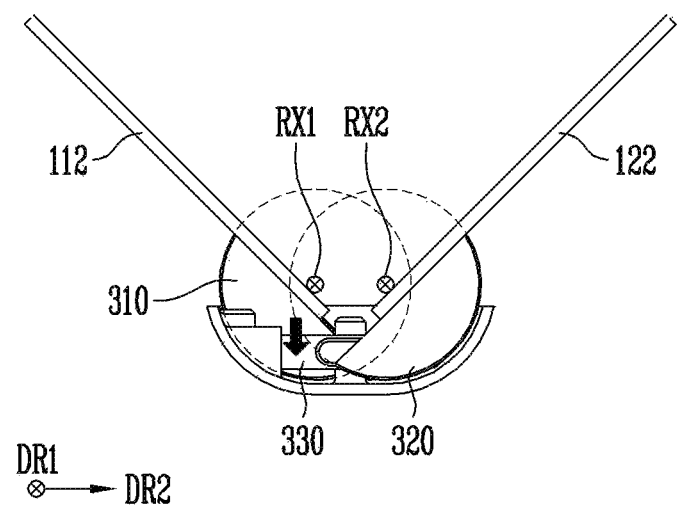
Figure 11C:
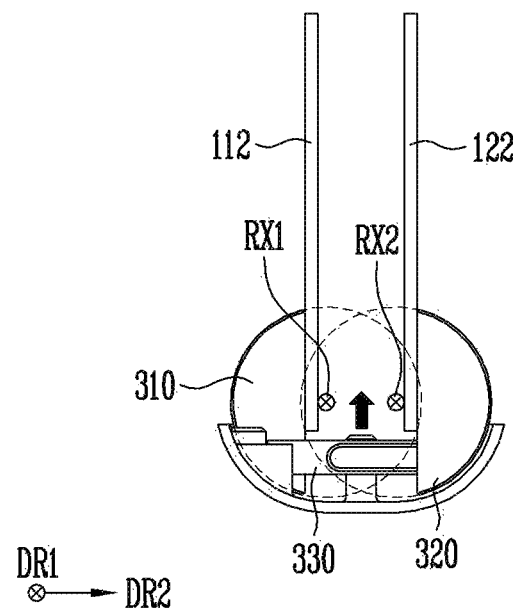

FIG. 10 is a perspective view illustrating an example of a method of driving the hinge device of FIG. 9A; and FIGS. 11A to 11C are diagrams schematically illustrating an example of the method of driving the hinge device of FIG. 10.

For convenience of description, illustration of the first and second brackets 340 and 350 is omitted in FIGS. 10 to 11C. In addition, FIGS. 11A to 11C show schematic planar shapes of the hinge device of FIG. 10 as viewed from the first direction DR1.

Referring to FIGS. 9A to 11C, the first rotor 310 and the second rotor 320 of the hinge device 300 may be concurrently (e.g., simultaneously) rotated in directions opposite to each other, and, thus, the foldable display device may be folded or unfolded.

As shown in FIG. 11A, in a state in which the foldable display device is fully unfolded, a horizontal surface of the first and second rotors 310 and 320 may be positioned to be parallel to the foldable display device. The horizontal surface of the first and second rotors 310 and 320 may be a surface opposite to each curved surface.

When the foldable display device is folded, the first rotor 310 may rotate in a clockwise direction and the second rotor 320 may rotate in a counterclockwise direction. Therefore, the first protrusion portion 312 and the second protrusion portion 322 may rotate in the first guide hole 332 and the second guide hole 334, respectively. The follower 330 may reciprocate in the third direction DR3 by rotation force of the first and second protrusion portions 312 and 322.

For example, as shown in FIG. 11B, when the first and second rotors 310 and 320 rotate at a first angle from the state in which the foldable display device is fully unfolded, the follower 330 may be moved vertically downward. In addition, as shown in FIG. 11C, when the first and second rotors 310 and 320 rotate from the first angle to a second angle, the follower 330 may be moved vertically upward.

In addition, the first and second base plates 112 and 122 may rotate based on the first and second rotation axes RX1 and RX2, respectively.

Therefore, symmetrical folding and unfolding may be performed in a two-axes hinge structure by interaction of rotation motion of the first and second rotors 310 and 320 and a straight line motion of the follower 330.

As described above, the foldable display device including the hinge device according to embodiments of the disclosure may implement folding and unfolding by using a simple connection structure of a plurality of rotors and a follower and the two-axes hinge structure based on rotation motion of the rotors and a straight line motion (vertical movement or horizontal movement) of the follower. Therefore, folding/unfolding angles of the first base plate 110, 111, or 112 (and a first panel support member DS1) and the second base plate 120, 121, or 122 (and a second panel support member DS2) coincide, and symmetrical folding/unfolding of the foldable display device may be implemented. In addition, a manufacturing cost may be reduced by eliminating a configuration including a complicated driving mechanism and a plurality of sophisticated gears, springs, and/or the like, and implementing a two-axes hinge mechanism with a simple structure.

Although the present disclosure has been described with reference to some example embodiments, those skilled in the art will understand that the disclosure may be variously changed and modified without departing from the spirit and scope of the disclosure as set forth in the following claims.

What is claimed is:

1. A foldable display device comprising:
   a display panel comprising a first display area, a second display area, and a foldable display area between the first display area and the second display area;
   a first base plate overlapping a portion of the foldable display area to guide folding and unfolding of the display panel;
   a second base plate overlapping another portion of the foldable display area to guide the folding and the unfolding of the display panel together with the first base plate;
   a first rotor coupled to the first base plate to rotate around a first virtual rotation axis;
   a second rotor coupled to the second base plate to rotate around a second virtual rotation axis in a direction opposite to a rotating direction of the first rotor;
   a follower disposed between and in contact with the first and second rotors to reciprocate in straight line motion relative to the first and second rotors in a first direction by rotation in a clockwise direction of at least one of the first and second rotors and to reciprocate in straight line motion relative to the first and second rotors in a direction opposite to the first direction by rotation in a counterclockwise direction of the at least one of the first and second rotors, the follower reciprocating in the first direction by a first distance by rotation by 45° in the clockwise direction of the at least one of the first and second rotors and reciprocating in the first direction by a second distance that is greater than the first distance by rotation by 90° in the clockwise direction of the at least one of the first and second rotors; and
   a bracket coupled to the first and second rotors to guide a rotation path of each of the first and second rotors,
   wherein the first direction is parallel to the first and second virtual rotation axes.

2. The foldable display device according to claim 1, further comprising a hinge cover coupled to the bracket to limit movement of the follower in a direction other than the first direction.

3. The foldable display device according to claim 2, wherein the follower is arranged between the bracket and the hinge cover.

4. The foldable display device according to claim 1, wherein the first rotor comprises a first curved surface having a diameter corresponding to the first virtual rotation axis and a first groove of a spiral shape on the first curved surface.

5. The foldable display device according to claim 4, wherein the second rotor comprises a second curved surface having a diameter corresponding to the second virtual rotation axis and a second groove of a spiral shape on the second curved surface.

6. The foldable display device according to claim 5, wherein the follower comprises:
   a first pin arranged to be inserted into the first groove of the first rotor and moved within the first groove; and
   a second pin arranged to be inserted into the second groove of the second rotor and moved within the second groove,
   wherein the first and second pins convert the rotation of the first and second rotors into the straight line motion of the follower.

7. The foldable display device according to claim 6, wherein the first rotor and the second rotor concurrently rotate at a same angle in directions opposite to each other.

8. The foldable display device according to claim 5, wherein spiral directions of the first groove and the second groove are opposite to each other.

9. The foldable display device according to claim 1, wherein the bracket comprises:
   a first side portion arranged to engage with a side surface of the first rotor to guide the rotation path of the first rotor; and
   a second side portion corresponding to an opposite side of the first side portion, and arranged to engage with a side surface of the second rotor to guide the rotation path of the second rotor.

10. The foldable display device according to claim 1, wherein a first side surface of the first rotor is in surface contact with a first side surface of the follower, and
    a first side surface of the second rotor is in surface contact with a second side surface of the follower opposite to the first side surface of the follower.

11. The foldable display device according to claim 10, wherein the follower is moved in the first direction when the first rotor rotates in the clockwise direction, and the follower is moved in the direction opposite to the first direction when the second rotor rotates in the clockwise direction.

12. The foldable display device according to claim 10, wherein, on a plane, the first side surface of the follower and the second side surface of the follower are symmetric with each other with respect to a symmetry axis corresponding to a second direction, and
the second direction is a direction perpendicular to the first direction and parallel to an unfolded state of the display panel.

13. The foldable display device according to claim 12, wherein the bracket comprises:
a first bracket arranged to engage with a second side surface of the first rotor to guide the rotation path of the first rotor; and
a second bracket arranged to engage with a second side surface of the second rotor to guide the rotation path of the second rotor, and
wherein the foldable display device comprises a first hinge group comprising the first rotor, the second rotor, the first bracket, the second bracket, and the follower.

14. The foldable display device according to claim 13, further comprising:
a second hinge group comprising a same structure as the first hinge group and arranged to be spaced apart from the first hinge group in the first direction,
wherein the second hinge group is configured in a form of the first hinge group being rotated by 180° on a plane.

15. The foldable display device according to claim 14, wherein, the follower included in the first hinge group and a follower included in the second hinge group are concurrently moved in directions opposite to each other when the display panel is folded or unfolded.

16. A foldable display device comprising:
a display panel comprising a first display area, a second display area, and a foldable display area between the first display area and the second display area;
a first base plate overlapping a portion of the foldable display area to guide folding and unfolding of the display panel;
a second base plate overlapping another portion of the foldable display area to guide the folding and the unfolding of the display panel together with the first base plate;
a first rotor coupled to the first base plate to rotate around a first virtual rotation axis;
a second rotor coupled to the second base plate to rotate around a second virtual rotation axis in a direction opposite to a rotating direction of the first rotor;
a follower in contact with the first and second rotors and reciprocating in a first direction by rotation of at least one of the first and second rotors; and
a bracket coupled to the first and second rotors to guide a rotation path of each of the first and second rotors,
wherein the follower comprises:
a first guide hole in a first side surface that is engaged with the first rotor to force the follower to move in the first direction relative to the first rotor in response to the rotation of the first rotor; and
a second guide hole in a second side surface that is engaged with the second rotor to force the follower to move in the first direction relative to the second rotor in response to the rotation of the second rotor, and
wherein widths in a horizontal direction of each of the first and second guide holes are greater than widths in a vertical direction of each of the first and second guide holes,
wherein the first direction corresponds to the vertical direction, and
wherein, when the first rotor rotates in a clockwise direction, the follower is sequentially moved in the first direction and a direction opposite to the first direction.

17. The foldable display device according to claim 16, wherein the first rotor comprises a first protrusion portion arranged on a first side surface of the first rotor to be inserted into the first guide hole, and
the second rotor comprises a second protrusion portion arranged on a first side surface of the second rotor to be inserted into the second guide hole.

18. The foldable display device according to claim 17, wherein a portion where the first protrusion portion that is in contact with an inside of the first guide hole is changed by the rotation of the first rotor, and
a portion where the second protrusion portion that is in contact with an inside of the second guide hole is changed by the rotation of the second rotor.

19. The foldable display device according to claim 17, wherein the bracket comprises:
a first bracket arranged to engage with a second side surface, which is an opposite side of the first side surface of the first rotor, to guide the rotation path of the first rotor; and
a second bracket arranged to engage with a second side surface, which is an opposite side of the first side surface of the second rotor, to guide the rotation path of the second rotor.

* * * * *